United States Patent
Rochberger

[19]

[11] Patent Number: 5,940,396
[45] Date of Patent: Aug. 17, 1999

[54] METHOD OF ROUTING IN AN ASYNCHRONOUS TRANSFER MODE NETWORK

[75] Inventor: Haim Rochberger, Netanya, Israel

[73] Assignee: 3COM LTD., Tel Aviv, Israel

[21] Appl. No.: 08/697,220

[22] Filed: Aug. 21, 1996

[51] Int. Cl.[6] .............................. H04L 12/46; H04L 12/56
[52] U.S. Cl. .......................... 370/408; 370/256; 370/395
[58] Field of Search ..................... 370/400, 401, 370/406, 408, 409, 389, 392, 395, 396, 397, 399, 256, 218; 395/200.64, 200.68, 675

[56] References Cited

U.S. PATENT DOCUMENTS

| | | | |
|---|---|---|---|
| 4,868,814 | 9/1989 | BerKovich et al. | 370/408 |
| 5,079,767 | 1/1992 | Perlman | 370/256 |
| 5,172,228 | 12/1992 | Israelsen | 358/133 |
| 5,291,477 | 3/1994 | Liew | 370/408 |
| 5,361,256 | 11/1994 | Doeringer et al. | 370/401 |
| 5,420,862 | 5/1995 | Perlman | 370/401 |
| 5,455,865 | 10/1995 | Perlman | 370/389 |
| 5,491,690 | 2/1996 | Alfonsi et al. | 370/400 |
| 5,495,479 | 2/1996 | Galaand et al. | 370/400 |
| 5,544,327 | 8/1996 | Dan et al. | 395/200.64 |
| 5,590,118 | 12/1996 | Nederlof | 370/218 |
| 5,600,638 | 2/1997 | Bertin et al. | 370/400 |
| 5,603,029 | 2/1997 | Aman et al. | 395/675 |
| 5,629,930 | 5/1997 | Beshai et al. | 370/396 |
| 5,649,108 | 7/1997 | Spiegel et al. | 370/400 |
| 5,673,263 | 9/1997 | Basso et al. | 370/400 |
| 5,831,975 | 4/1996 | Chen et al. | 370/256 |

*Primary Examiner*—Chi H. Pham
*Assistant Examiner*—Steven Nguyen
*Attorney, Agent, or Firm*—David J. Weitz; Wilson Sonsini Goodrich & Rosati

[57] ABSTRACT

A novel method of routing and performing autoconfiguration in an ATM network is disclosed. The method simplifies the configuration and routing for ATM networks having a relatively large number of nodes. Networks are constructed in hierarchical fashion in the form of branches and trees and assigned network address prefixes in accordance with their location in the network. Network nodes periodically exchange identification information permitting both switches on either side of a link to be aware of who they are connected to. Each node registers a network address and its associated significant length for each of its neighbors on each of its links. A node performs routing by comparing the destination address against each of its registered addresses for all its links. The routing method takes advantage of the network address prefix to ensure that the routing proceeds in the correct direction towards the destination and does not enter a tree or a branch that does not contain the destination. In addition, each node performs load balancing at each point in the routing process. A node can generate crankback messages if the routing leads to a dead end.

18 Claims, 7 Drawing Sheets

METHOD OF ROUTING IN AN ASYNCHRONOUS TRANSFER MODE NETWORK

FIELD OF THE INVENTION

The present invention relates generally to asynchronous transfer mode (ATM) networks and more particularly relates to a method of performing routing and autoconfiguration within an ATM network.

BACKGROUND OF THE INVENTION

1. Introduction

ATM originated as a telecommunication concept defined by the Comite Consulatif International Telegraphique et Telephonique (CCITT), now known as the International Telecommunications Union (ITU), and the American National Standards Institute (ANSI) for carrying user traffic on any User to Network Interface (UNI) and to facilitate multimedia networking between high speed devices at multi-megabit data rates. ATM is a method for transferring network traffic, including voice, video and data, at high speed. Using this connection oriented switched networking technology centered around a switch, a great number of virtual connections can be supported by multiple applications through the same physical connection. The switching technology enables bandwidth to be dedicated for each application, overcoming the problems that exist in a shared media networking technology, like Ethernet, Token Ring and Fiber Distributed Data Interface (FDDI). ATM allows different types of physical layer technology to share the same higher layer—the ATM layer.

ATM uses very short, fixed length packets called cells. The first five bytes, called the header, of each cell contain the information necessary to deliver the cell to its destination. The cell header also provides the network with the ability to implement congestion control and traffic management mechanisms. The fixed length cells offer smaller and more predictable switching delays as cell switching is less complex than variable length packet switching and can be accomplished in hardware for many cells in parallel. The cell format also allows for multiprotocol transmissions. Since ATM is protocol transparent, the various protocols can be transported at the same time. With ATM, phone, fax, video, data and other information can be transported simultaneously.

The components of the ATM header consist of the following fields. A generic flow control (GFC) field provides flow control; a virtual path identifier (VPI)/virtual channel identifier (VCI) field allows the network to associate a given cell with a given connection; a payload type identifier (PTI) field indicates whether the cell contains user information or management related data and is also used to indicate a network congestion state or for resource management (i.e., the EFCI bit which is part of the PTI field); a cell loss priority (CLP) field indicates that cells with this bit set should be discarded before cells with the CLP bit clear; a header error check (HEC) field is used by the physical layer for detection and correction of bit errors in the cell header and is used for cell delineation.

The provisioning of an ATM network connection may include the specification of a particular class of service. The following list the various classes of service currently defined in ATM. Constant bit rate (CBR) defines a constant cell rate and is used for emulating circuit switching (e.g., telephone, video conferencing, television, etc.). Variable bit rate (VBR) allows cells to be sent at a variable bit rate. Real-time VBR can be used for interactive compressed video and non real-time can be used for multimedia e-mail.

Available bit rate (ABR) is designed for data traffic (e.g., file transfer traffic, etc.) and is the class service connected with resource management. The source is required to control its rate depending on the congestion state of the network. The users are allowed to declare a minimum cell rate, which is guaranteed to the virtual circuit by the network. ABR traffic responds to congestion feedback from the network.

A fourth class of service, unspecified bit rate (UBR), is utilized by data applications that are not sensitive to cell loss or delay and want to use leftover capacity. During congestion, the cells are lost but the sources are not expected to reduce their cell rate.

ATM is a connection oriented transport service. To access the ATM network, a station requests a virtual circuit between itself and other end stations, using the signaling protocol to the ATM switch. ATM provides the User Network Interface (UNI) which is typically used to interconnect an ATM user with an ATM switch that is managed as part of the same network.

2. The Prior Art Standard Solution for Routing

The current standard solution for routing in a private ATM network is described in Private Network Node Interface (PNNI) Phase 0 and Phase 1 draft specifications published by. ATM Forum 94-0924. The Phase 0 draft specification is also referred to as Interim InterSwitch Signaling Protocol (IISP). The goal of the PNNI specifications is to provide customers of ATM network equipment some level of multi-vendor interoperability.

An illustration of the switching system architecture, generally referenced 200, used as the reference model for the PNNI specifications is shown in prior art FIG. 1. Network 200 comprises one or more private ATM networks 204. One or more ATM users 202 are coupled to each of the private ATM networks 204.

The Interim Local Management Interface (ILMI) for the PNNI protocol specification provides an auto-port configuration capability. This capability functions to minimize manual configuration operations for PNNI ports of switches. The Phase 0 solution to auto-port configuration is based on hop by hop routing utilizing a 'best match' scheme. The Phase 1 solution is based on Open Shortest Path First (OSPF) with the additions necessary for ATM. This scheme is essentially a 'source routing' scheme whereby each node has basic knowledge of the structure of the entire network and uses this knowledge to build a complete path from the source to the destination. When a connection is to be set up from a source to a destination, the source sends out a SETUP message that has within it the address of the destination. Each ATM network node along the way reads the next node from the SETUP message and forwards the message to an appropriate next node. This continues until the SETUP message arrives at its destination.

In the IISP Phase 0 specification standard, the ATM nodes in the network route the signaling SETUP message hop by hop (i.e., node by node) using a 'best match' scheme. ATM addresses are 20 bytes long but only 19 bytes can be used for routing purposes. According to the IISP Phase 0 standard, several prefixes of the ATM address for each link can be registered.

When a node (i.e., an ATM switch) needs to decide to which particular node to route the received SETUP message to, it compares the destination address with all the registered addresses for all of its ports. Only if an address prefix is found that fully matches the destination address can the destination address be considered for routing. After all the prefixes are compared, the prefix address that is the longest is used to determine the routing of the SETUP message. It is important to note that the standard does not require the transfer of any routing information between two neighboring nodes. In addition, the standard also does not permit the use of a TRANSIT NET ID parameter during the signaling phase, which can be used to route to a different routing domain.

This signaling scheme has several disadvantages. One disadvantage is that all the prefixes of all neighboring nodes must be registered manually on each of the respective ports. For example, if a port is disconnected from a neighbor and connected to a new neighbor, then the registered addresses must be manually changed in both nodes. This type of network can be termed an absolutely static network.

Another disadvantage of this signaling scheme is that there is no default routing provision. The signaling protocol does not includes default routing intelligence in the event no prefixes are registered in node. Thus, it is a requirement that at least one prefix address be registered on a port.

A third disadvantage of this routing scheme is that the protection against the formation of endless loops is lacking.

Thus, the IISP Phase 0 solution may be adequate for small static networks of no more than approximately 4 to 5 nodes, but when assembling larger networks with over one hundred nodes, this solution becomes totally unmanageable and virtually impossible for network managers.

SUMMARY OF THE INVENTION

Accordingly, it is an object of the present invention to provide a network that overcomes the disadvantages of the prior art.

It is another object of the present invention to provide a network that is simple to assemble, requiring minimal manual configuration on each node and which does not depend on the size of the network.

Another object of the present invention is to provide a network which is dynamic whereby if a link is disconnected from a node a connected to a different node, the nodes configure themselves automatically.

Yet another object of the present invention is to provide a network which has the capability of preventing loops from forming.

Another object of the present invention is to provide a network which guarantees finding a path to a node if one exists.

The present invention is a method of routing and performing autoconfiguration in an ATM network. The method simplifies the configuration and routing for ATM networks having a relatively large number of nodes. Networks are constructed in hierarchical fashion in the form of branches and trees and assigned network address prefixes in accordance with their location in the network. Network nodes periodically exchange identification information permitting both switches on either side of a link to be aware of who they are connected to. Each node registers a network address and an associated significant length for each of its neighbors on each of its links. A node performs routing by comparing the destination address against each of its registered addresses for all its links. The routing method takes advantage of the network address prefix to ensure that the routing proceeds in the correct direction towards the destination and does not enter a tree or a branch that does not contain the destination. In addition, each node performs load balancing at each point in the routing process. A node can generate crankback messages if the routing leads to a dead end.

There is thus provided in accordance with a preferred embodiment of the present invention a method of routing in an ATM network, the network including a plurality of nodes, each the node having one or more ports and possibly connected to one or more users through a first type link, the nodes connected to each other through a second type link, the network including a source node connected to a source user and a destination node connected to a destination user having a destination address, the source user generating a SETUP message containing the destination address, each node having a network address comprising a network prefix and a significant length, the method comprising the steps of constructing the network in hierarchical fashion out of one or more trees, each tree having a root, such that the trees are connected in a mesh at their roots, exchanging identification messages between the nodes across each of the links. On each node, termed the current node, in the routing path: making a first determination of whether the destination address matches the network address of a user connected to the current node through the first type link, outputting the SETUP message to a port in accordance with the first determination if the first determination is true, making a second determination of whether the destination address fully matches the network address of a node connected to the current node through the second type link, outputting the SETUP message to a port in accordance with the second determination if the second determination is true, making a third determination of whether the destination address partially matches the network address of a node connected to the current node through the second type link, outputting the SETUP message to a port in accordance with the third determination if the third determination is true, and outputting the SETUP message onto a default port.

Further, the step of constructing comprises the steps of arranging the plurality of nodes so as to form one or more trees, each tree having a root and one or more nodes coupled to the root, connecting the trees together at their roots such that the roots form at least a partial mesh, and assigning each the node a network address, assigning the network addresses in hierarchical fashion such that nodes further away from the root are assigned longer network prefixes and network nodes within the same hierarchical level have equal significant lengths.

In addition, the step of exchanging comprises the steps of each the node sending an identification message out on ports that are connected to other nodes, the identification message comprising a network prefix and a significant length, and each node receiving the identification message, registering the network prefix for the port it was received on.

Further, the step of making a first determination comprises comparing the full network address against the network addresses of each user connected to the current node.

The step of making a second determination comprises choosing a node coupled to the current node whose network address prefix, up to its significant length, is the longest address prefix that completely matches the destination address prefix.

The step of making a third determination comprises choosing a node coupled to the current node whose network address prefix, up to its significant length, partially matches the destination address prefix, the match chosen from several partial matches is the match with the shortest significant length. The step of outputting the SETUP message onto a default port comprises choosing a node coupled to the current node having a network address prefix with the shortest significant length. The significant length of the network address prefix of the chosen node must be smaller than or equal to the significant length of the network address prefix of the current node.

The method further comprising making a forth determination of whether the destination address prefix matches the address prefix of the current node, and outputting a RELEASE message to the port the SETUP message was received on.

There is also provided in accordance with a preferred embodiment of the present invention a method of constructing an ATM network, the network including a plurality of nodes, the nodes connected to each other by one more links, each node having a network address comprising a network prefix and a significant length, the method comprising the steps of arranging the plurality of nodes so as to form one or more trees, each tree having a root and one or more nodes coupled to the root, connecting the trees together at their roots such that the roots form at least a partial mesh, and assigning each the node a network address, assigning the network addresses in hierarchical fashion such that nodes further away from the root are assigned longer network prefixes and network nodes within the same hierarchical level have equal significant lengths.

Further, there is provided in accordance with a preferred embodiment of the present invention a method of routing in an ATM network, the network including a plurality of nodes, the nodes connected to each other by one more links, the network including a source node connected to a source user and a destination node connected to a destination user, the source and the destination user connected to the source node and the destination node, respectively, each node having a network address comprising a network prefix and a significant length, the method comprising the steps of on each node, termed the current node, in the routing path: making a first determination of whether the destination address matches the network address of a user connected to the current node through the first type link, outputting the SETUP message to a port in accordance with the first determination if the first determination is true, making a second determination of whether the destination address fully matches the network address of a node connected to the current node through the second type link, outputting the SETUP message to a port in accordance with the second determination if the second determination is true, making a third determination of whether the destination address partially matches the network address of a node connected to the current node through the second type link, outputting the SETUP message to a port in accordance with the third determination if the third determination is true, and outputting the SETUP message onto a default port.

BRIEF DESCRIPTION OF THE DRAWINGS

The invention is herein described, by way of example only, with reference to the accompanying drawings, wherein.

DETAILED DESCRIPTION OF THE INVENTION

The principles of the present invention can best be explained with reference to sample network configurations. The sample network configurations illustrated in the Figures are for illustration purposes only and in no way are meant to limit the scope of the present invention. One skilled in the art could easily apply the principles of the present invention to networks of any desired configuration and size.

Building A Network

To aid in understanding the present invention, the following term is used throughout. The term X* represents an ATM address prefix having a significant length |X| and a value X. Thus, for example, B21* represents an ATM address having a prefix with significant length |B21| and value B21. An ATM prefix address of 47.00.00.00.00.00.23.34.54.6* represents an ATM address having significant length 19 and a value of 47.00.00.00.00.00.23.34.54.6.

Figure 1:
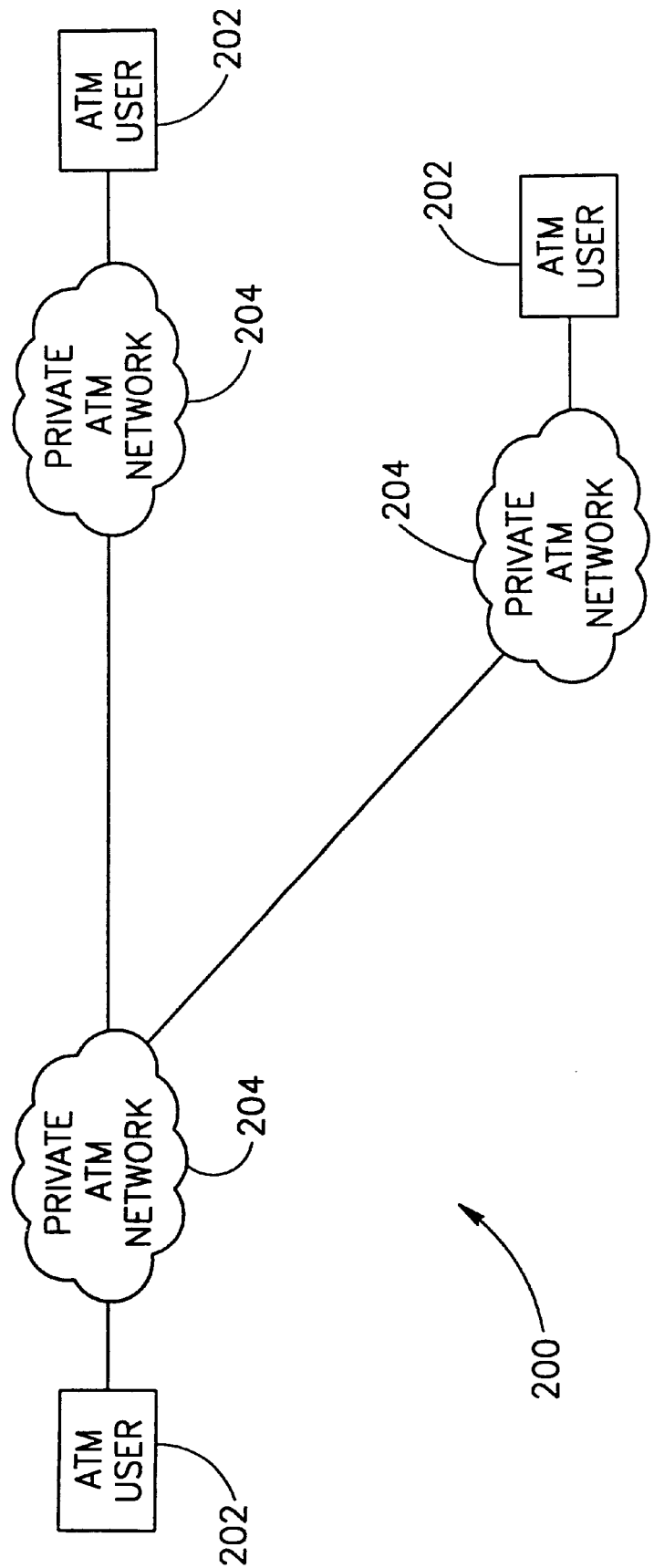
FIG. 1 is a high level block diagram illustrating a sample prior art switching system architecture used as the reference model for the PNNI specifications.
Figure 2:
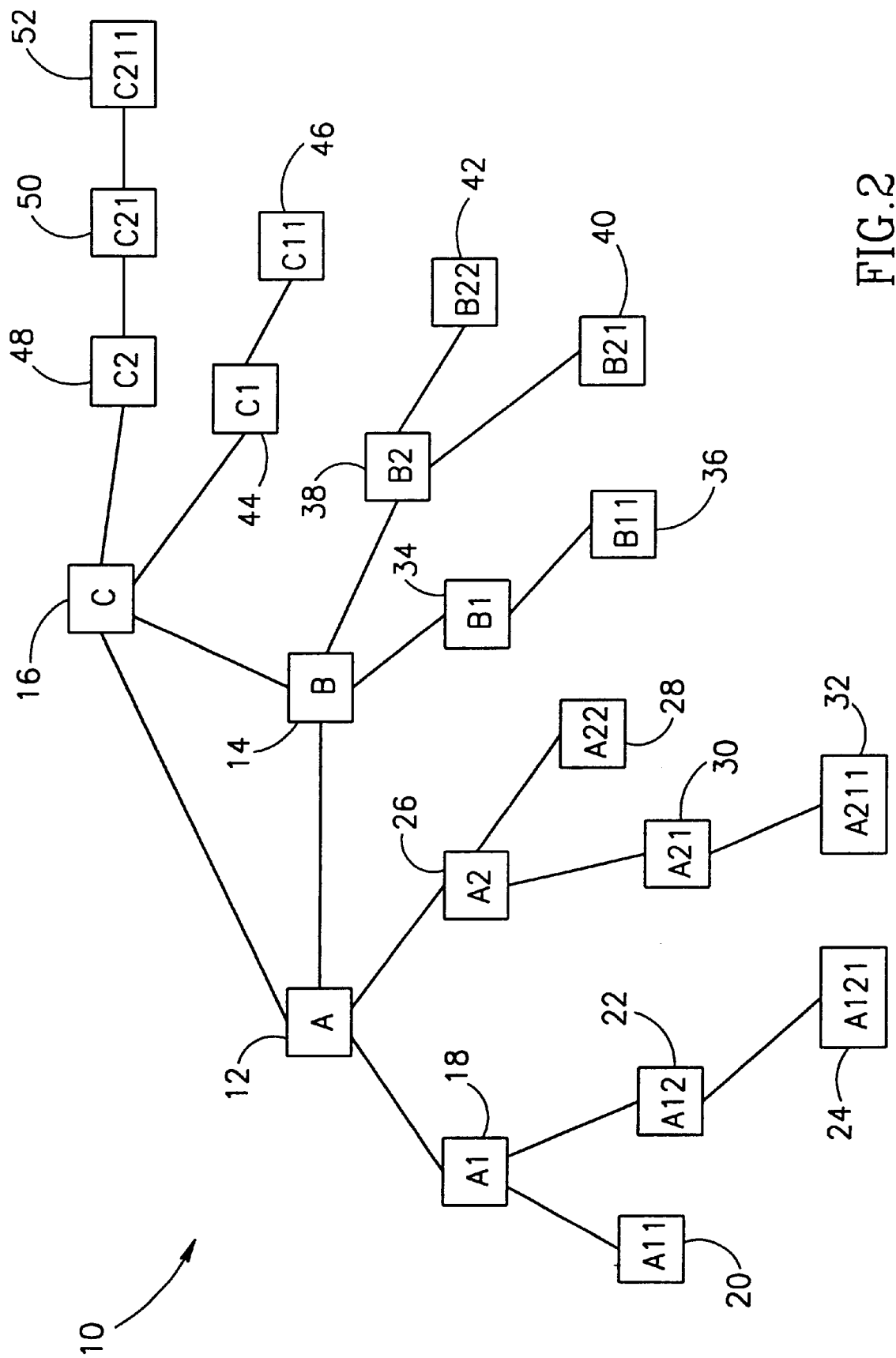
FIG. 2 is a high level block diagram illustrating a sample network that utilizes the address assignment scheme of the present invention.

A high level block diagram illustrating a sample network, generally referenced 10, that utilizes the address assignment scheme of the present invention is shown in FIG. 2. Shown in this Figure are three root nodes A, B, C referenced 12, 14, 16, respectively. Attached to root node A are two branches A1, A2 referenced 18, 26, respectively. Node A1 is connected to node A11, referenced 20 and node A12, referenced 22. Node A12 is connected to node A121, referenced 24. Node A2 is connected to two nodes A21, A22, referenced 30, 28. Node A21 is connected to node A211, referenced 32.

Attached to root node B are two branches B1, B2 referenced 34, 38, respectively. Node B1 is connected to a single node B11, referenced 36. Node B2 is connected to two nodes B21, B22, referenced 40, 42, respectively.

Attached to root node C are two branches C1, C2 referenced 44, 48, respectively. Node C1 is connected to a single node C11, referenced 46. Node C2 is connected to node C21, referenced 50, which is connected, in turn, to node C211, referenced 52.

All nodes in the network 10 are connected to each other in hierarchical fashion analogous to the root system or inverted branches of a tree, for example. Networks are constructed by building individual root systems or branches and connecting them in a mesh or a partial mesh at the roots. The addresses that are assigned to each node are assigned according to the nodes position in the branch. Nodes closer to the roots have addresses with significantly shorter prefixes. Nodes further down the tree have addresses with significantly longer prefixes. It is important to note that the length of the addresses do not change, only the significant length of the address changes.

Figure 3:
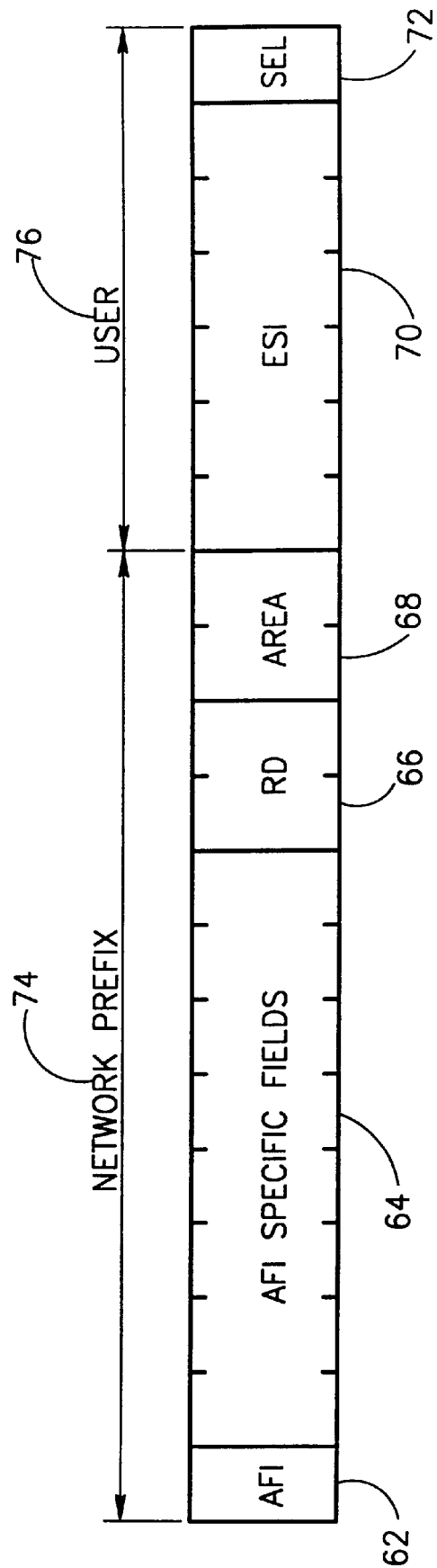
FIG. 3 is a diagram illustrating the field contents of an ATM address.

A diagram illustrating the field contents of an ATM address is shown in FIG. 3. All ATM addresses are a fixed 20 bytes in length. ATM addresses comprises two portions. The first portion is a 13 byte network prefix 74 and the second portion is a 7 byte user prefix 76. The combination of the network prefix and the user prefix make up the complete ATM address. The network prefix comprises an authority and format identifier (AFI) byte 62, 8 bytes of AFI specific fields 64, 2 bytes of routing domain (RD) 66 and 2 bytes for the Area 68. The user prefix 76 comprises 6 bytes for the end station identifier (ESI) 70 and one selection (SEL) byte 72. The ESI portion is typically the media access control (MAC) address of the end station. The SEL byte is used to distinguish between applications where multiple applications on the end station is sharing a common address. Each application is assigned a unique SEL byte.

Figure 4:
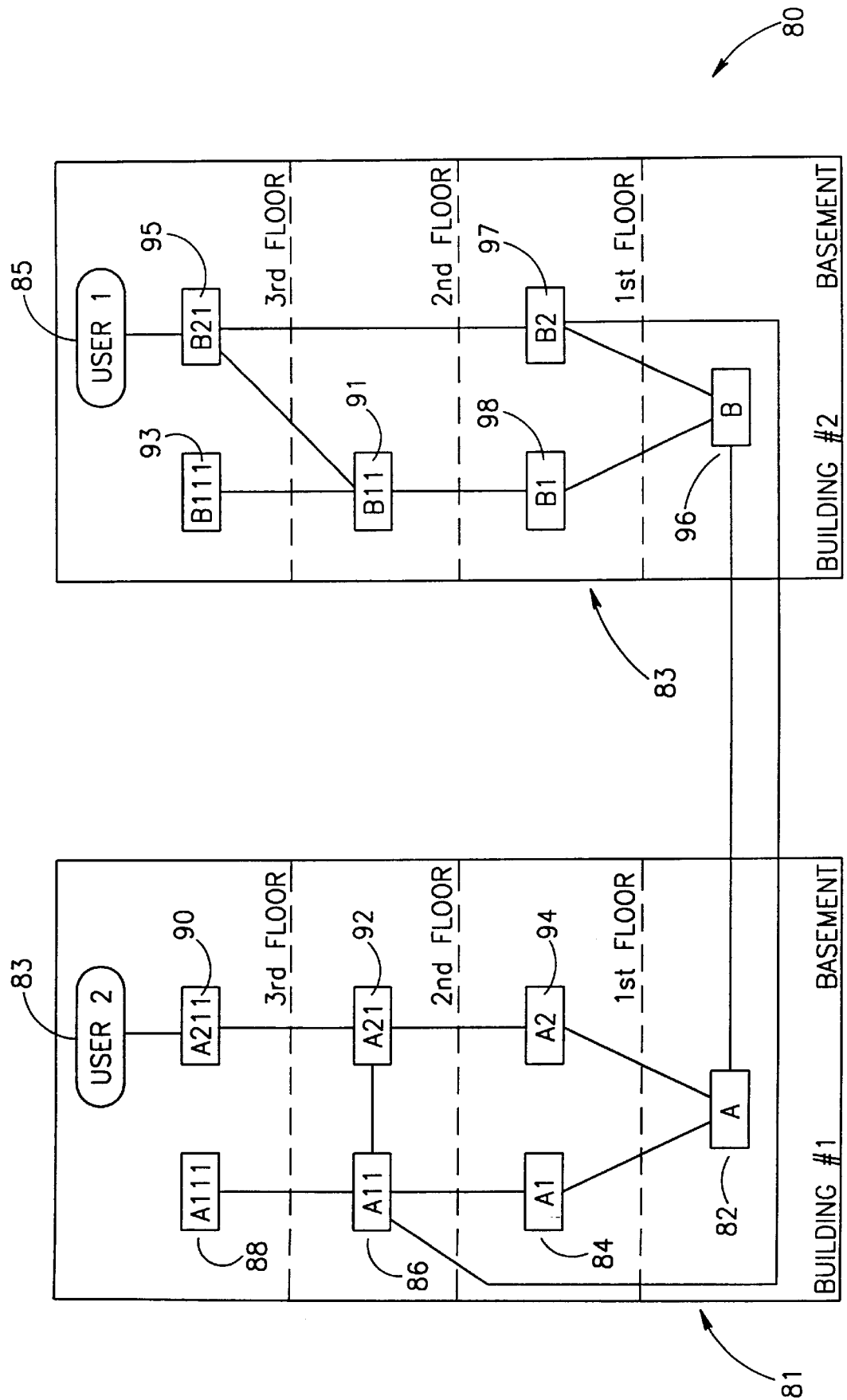
FIG. 4 is a high level block diagram illustrating the address assignment scheme of the present invention for a sample network spanning two buildings.

Another illustration of a sample ATM network comprising a plurality of nodes wherein each node is assigned a unique address using the addressing scheme of the present invention will now be presented. A high level block diagram illustrating the sample ATM network, generally referenced 80, spanning two buildings is shown in FIG. 4. Each of the two buildings, building #1, referenced 81, and building #2, referenced 83, comprises multiple stories and houses a plurality of nodes (i.e., ATM switches) spanning multiple floors. In the example shown in FIG. 4, both buildings comprise a basement and three floors.

Building #1 comprises a network having a node A, referenced 82 connected to nodes A1, A2 on the first floor, referenced 84, 94, respectively. Nodes A1, A2 are connected to nodes A11, A21, respectively, located on the second floor and referenced 86, 92, respectively. Node A11 is also connected to node A21. Nodes A11, A21 are connected to nodes A111, A211, respectively, located on the third floor and referenced 88, 90, respectively. A user, called USER2 83, is connected to node A211 on the 3rd floor.

Building #2 comprises a network having a node B, referenced 96 connected to nodes B1, B2 on the first floor, referenced 98, 97, respectively. Node B1 is connected to node B11 located on the second floor and referenced 91. Node B2 is connected to node B21, located on the third floor and referenced 95. Node B11 is connected to node B111, located on the third floor and referenced 93. In addition, node B21 95 is connected to USER1 85 and to node B11 91. Node B2 97 is also connected to node A11 86 in building #1 81.

Each node in the network is assigned a 13 byte network prefix which are used for ILMI (WHAT DOES THIS STAND FOR) address registration of ATM addresses for users such as network interface cards (NICs). In addition to the unique address prefix, each node is also assigned a significant length associated with that address prefix. The address prefix and the significant length are used to make routing decisions. The significant length is counted in nibbles. For example the address prefix 47.00.00.00.00.00.23.34.54.6* is translated into the network address prefix 47.00.00.00.00.00.23.34.54.60.00.00.00 having a significant length of 19.

A requirement of an ATM network of the present invention is that every node must be able to route to any other node. This is accomplished by constructing the network, such as the network illustrated in FIG. 4, using the method illustrated in FIG. 5.

Figure 5:
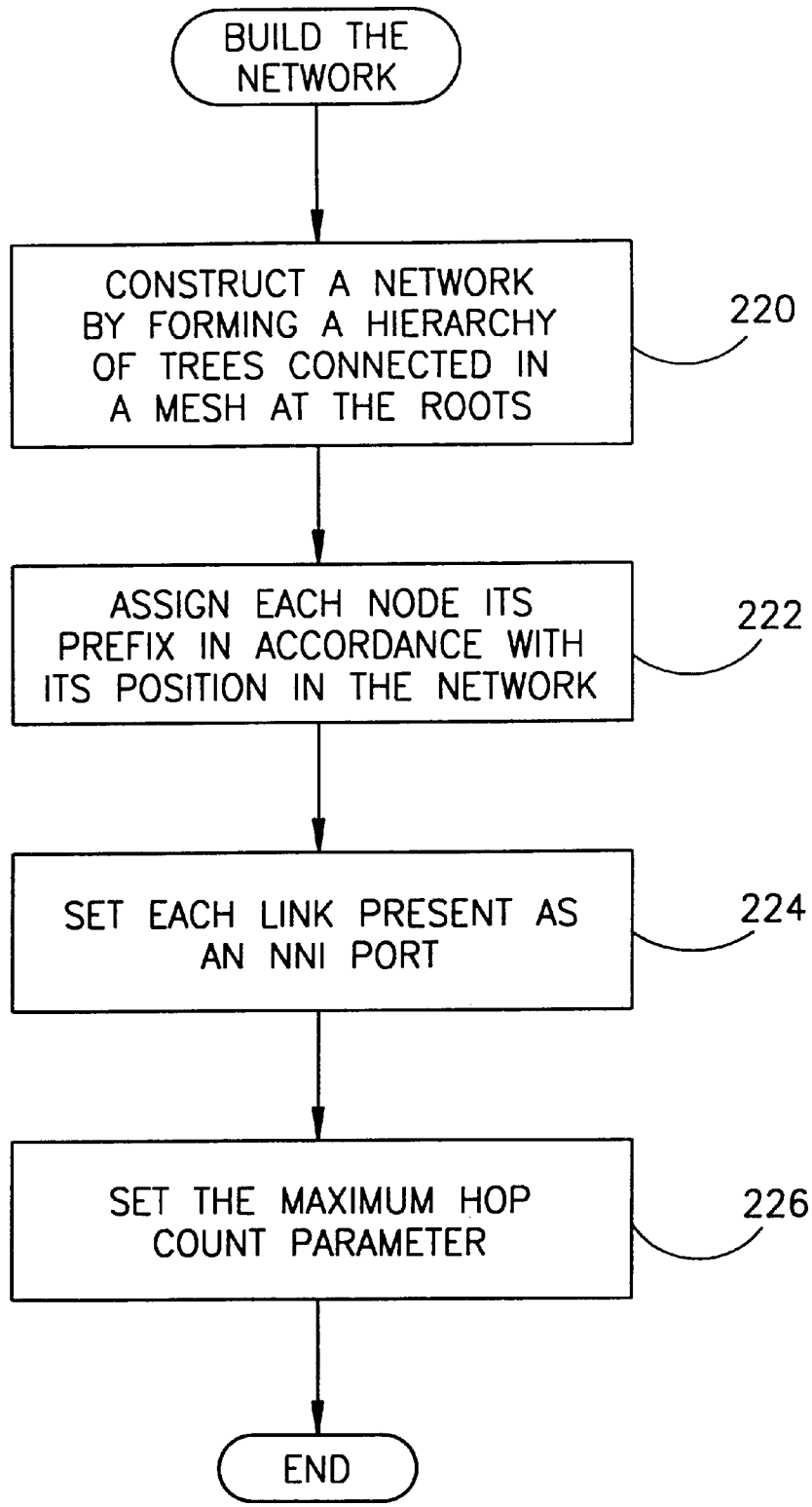
FIG. 5 is a high level flow diagram illustrating the method of the present invention of constructing an ATM network.

With reference to FIGS. 4 and 5, first, the nodes are placed into hierarchical trees that are then connected together at the roots (step 220). The roots of the trees (or branches) are connected together to form a complete or partial mesh. As shown in FIG. 4, the roots (i.e., nodes A and B) are located in the basement, which would typically be the case as these nodes form the backbone of the network. In building #1, two branches headed by nodes A1 and A2 are created which are connected to the root. Connected to node A1 are nodes A11 and A111. Connected to node A2 are nodes A21 and A211. In addition, nodes A11 and A21 are connected on the second floor. In building #2, two branches headed by nodes B1 and B2 are also created which are connected to the root. Connected to node B1 are nodes B11 and B111. Connected to node B2 is node B21.

Then, each node in the network is assigned a unique address prefix in accordance with its location in the network (step 222). The roots are assigned single letter address prefixes. Nodes one level down from the root are assigned address prefixes with an additional nibble (e.g., A1, B1, etc.). Nodes two level down from the root are assigned address prefixes with two additional nibbles (e.g., A11, B11, etc.) Nodes within the same level that are connected to the same node one level below, are numbered sequentially (e.g., A11, A12, A13, etc.). Thus, for example, in building #1, the two nodes connected to node A are given prefixes of A1 and A2. Once the prefixes have been ordered, each node is assigned its respective prefix (e.g., A*, A1*, B2*, B21*, etc.). Then, within each node, each link used to construct the network is configured as a NNI port (step 224). The maximum hop count parameter is then set on each node (step 226).

It is important to note that the hierarchy is defined by the significant length of the address prefix, the remainder of the address is a don't care for routing purposes. In other words, the shorter the significant length of the address prefix, the closer to the root node this particular node is in the network. The longer the significant length of the address prefix, the further away from the root node this particular node is in the network.

Automatic Exchange of Prefixes

Figure 6:
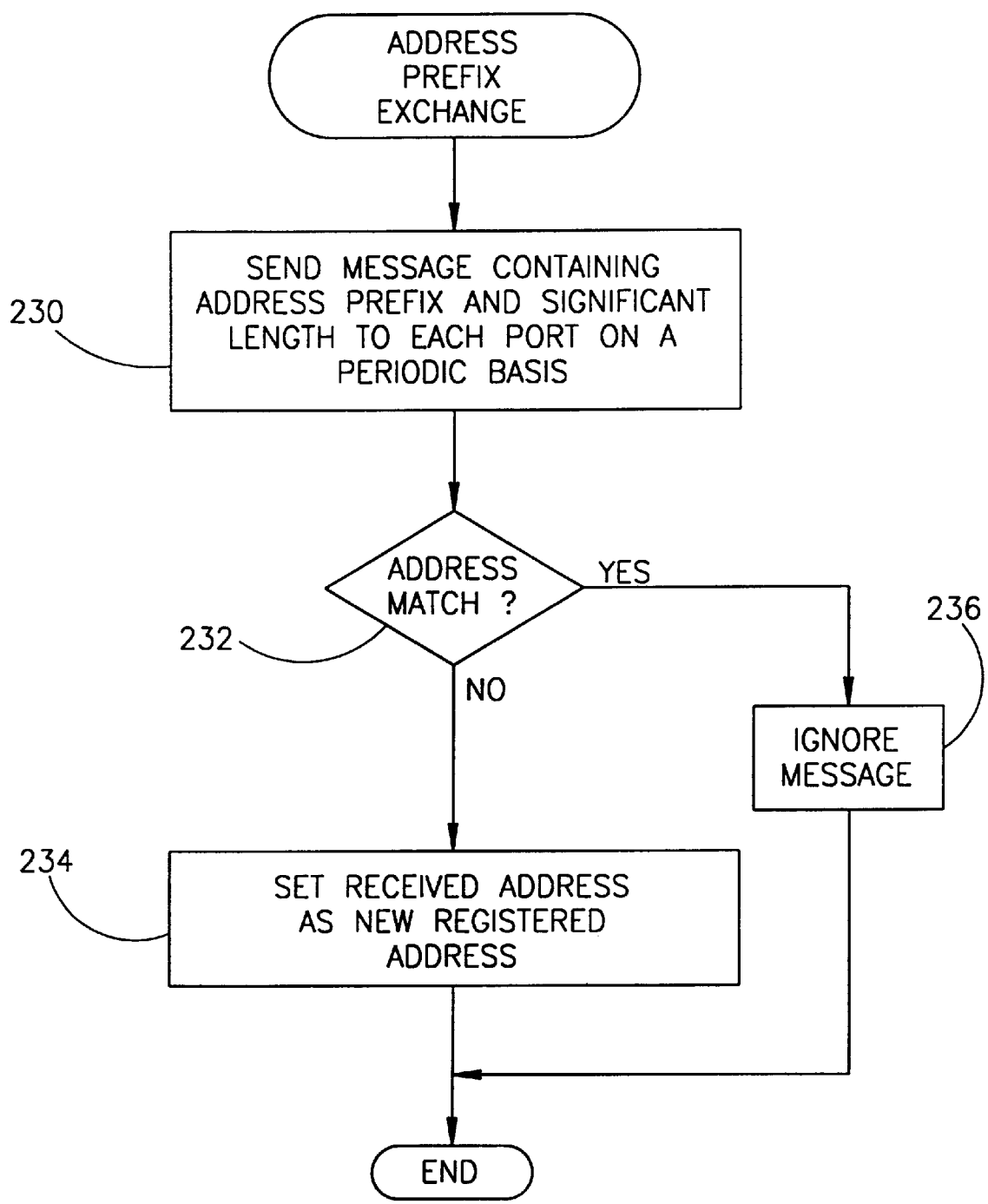
FIG. 6 is a high level flow diagram illustrating the method of the present invention of exchanging address prefixes.

With reference to FIG. 6, the address prefix exchange method will now be described. In the ATM network of the present invention, each node knows who its neighbors are. This is accomplished by each node sending out on all its NNI ports an identification message that comprises the address prefix assigned to it and its significant length (step 230). This message is sent out periodically (e.g., every second). The nodes that receive it compare the address prefix in the message to the special NNI type address that is registered on the port the message was received on (step 232). If the addresses do not match or there is no NNI address registered, then the node makes the received address prefix the new registered NNI address for that port and changes its routing tables accordingly (step 236). If the address do match, the message is ignored (step 234).

In applying the method of FIG. 5 to the network example of FIG. 4, node A will register three NNI addresses; the address prefixes A1, A2 and B each on its respective link. node B also registers three NNI addresses; the address prefixes A, B1 and B2.

Each node sending out identification messages on a periodic basis automatically permits the node to almost immediately detect if it becomes connected to a new neighbor. If a change is detected, the nodes modifies its routing tables accordingly. In addition, since each node address prefix is unique and is assigned in hierarchical fashion as described above, it is guaranteed that either the local address prefix (i.e., the address prefix of the node itself) or the remote node address prefix will be smaller.

The IISP signaling specification requires that one side of a link be denoted as the USER and the other side as the NETWORK. In networks constructed in accordance with the present invention, on NNI links, if the significant length of the local prefix (i.e., of the node itself) is shorter than that of a neighbor, then the local side is set as the NETWORK. This particular link attribute setting allows the signaling to automatic align after a dynamic link replacement when a nodes neighbors are changed.

Thus, the automatic exchange of network address prefixes causes the routing tables of each node to be updates and permits the signaling to 'come up'. This is in contrast to the prior art networks (e.g., IISP Phase 0) that require link attributes to be set manually. The method of the present invention is especially advantageous in large networks of more than two nodes.

As an alternative to the automatic exchange of network addresses, the transfer of addresses can be performed manually at each node or can be performed in accordance with ILMI registration procedures.

Routing Rules

The following description of the routing method of the present invention is based on the assumption that the network and its constituent nodes have been configured in accordance with the methods described above.

Figure 7:
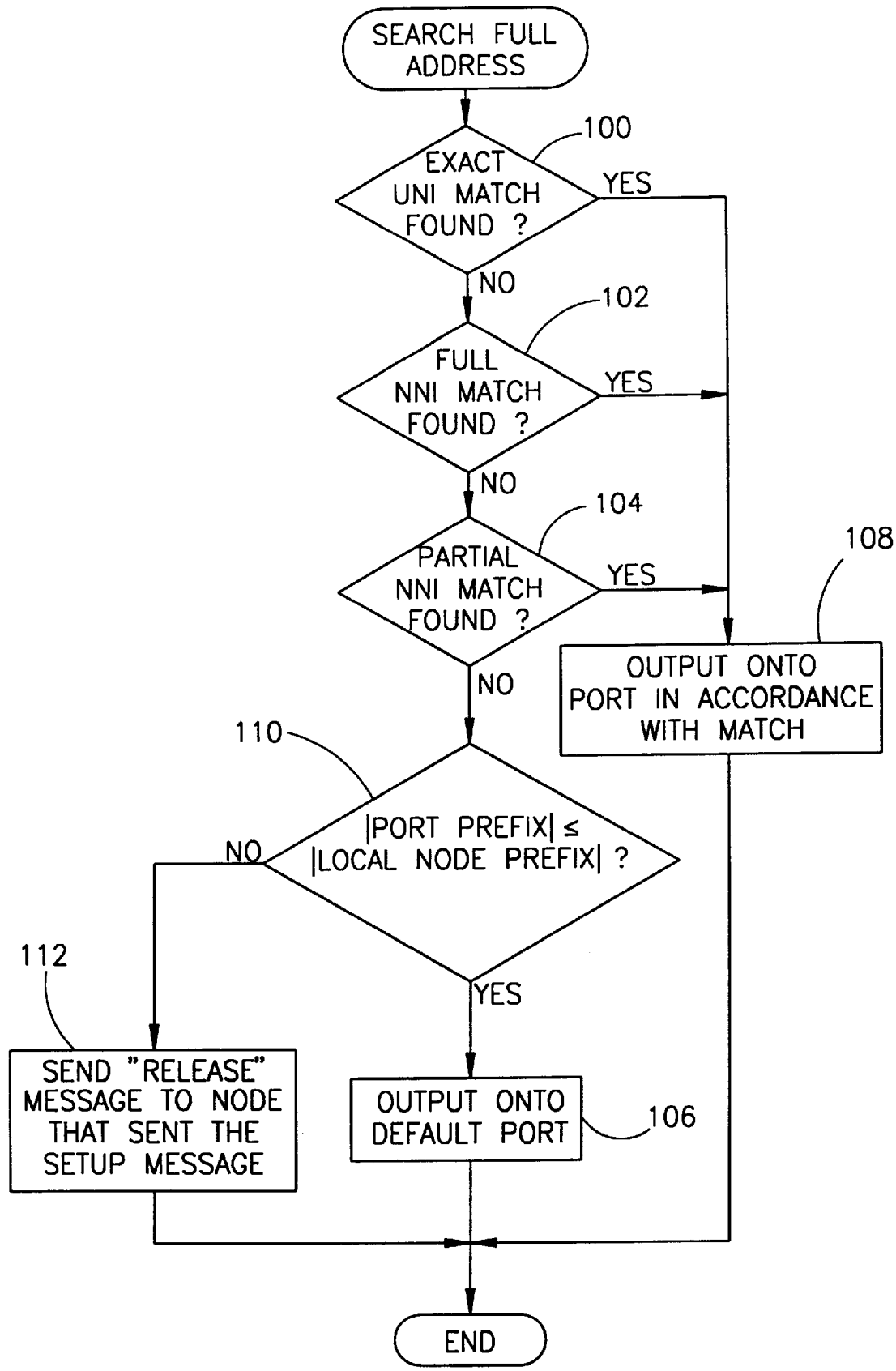
FIG. 7 is a high level flow diagram illustrating the method of the present invention for routing a path from a source node to a destination node.

A high level flow diagram illustrating the method of the present invention for routing a path from a source node to a destination node is shown in FIG. 7. When a connection is to be established from one ATM user (i.e., the source) to another (i.e., the destination), a SETUP message is generated and sent from the source user to the node it is connected to. The SETUP message comprises, among other things, a destination ATM node address. The following method is first performed on the node connected to the source user.

First, the full 20 byte registered address on each user to network interface (UNI) port (i.e., link) is checked for a match with the destination address (step 100). In other words, it is first checked to see whether the destination address is local (i.e., the destination user is connected to that particular node). If a match is found, the message is output onto the appropriate port (step 108).

If no match was found during the previous step, the registered address of each NNI port is then compared to the destination address to find a full match (step 102). However, only those registered port addresses that match through their entire significant length are considered. During this step, partial matches are not considered. If a full match is found, the message is output onto the appropriate port (step 108). For example, given a destination address prefix of A113 (i.e., significant length of 4), only a port with a registered address prefix that matches, through its entire significant length, will be considered a full match during this step. Thus, ports having registered addresses of A1, A11 or A113 would be considered full matches. Ports A2, A12, A112, A1135, A11373 and A1134, for example, would not be considered full matches. The port address A11, for example, is considered a match because the first three nibbles (i.e., its significant length |A11|) of its address matches the first three nibbles of the destination address. Note that in this step there may be more than one port with a best match. In this case, the chosen best match is that port with an address prefix that has the shortest significant length.

In no full NNI match was found in the previous step, then the registered address of each NNI port is compared to the destination address to find the best partial match (step 104). The best partial match can be less than the significant length and is the address that matches for the largest number of significant digits. This step may generate more than one best partial match. In this case, the chosen best partial match is that address prefix that has the shortest significant length. If a match is found, the message is output onto the appropriate port (step 108).

If no match was found in the previous step, then it is checked whether there is a port connected to the local node that has an address whose significant length is shorter than or equal to the significant length of the address of the local node itself (step 110). If such as address if found, the message is placed onto the output port (i.e., link) whose address prefix has the shortest significant length (i.e., the default port) (step 106). If no such address is found, a RELEASE message is sent back to the node that sent the SETUP message to the local node (step 112).

Each node that the message is transmitted to repeats the method of FIG. 7. With reference to FIG. 7, the first step 100 will match user destination addresses that are connected to that particular node that received the message. The next step 102 steers the message in the correct direction of the destination. If a full match was found it can be assumed that the next node is on the destination node's tree and is also on the same branch. Step 104 functions to steer the message to the next node that is on the same tree as the destination's node, but on a different branch. The next node will receive the message and route it. If step 106 is reached, it means that there is no way to access the next node's tree. Step 104 functions to steer the packet so as to 'climb down' this particular tree because it is likely that the roots are connected and thus a path exists to the destination's tree.

The method of FIG. 7, is designed under the assumption that it is wasteful to 'go up' a tree that is not the destination node's tree. Thus, the method of FIG. 7 functions to prevent random non-stop searching.

An overriding rule in connection with the method of FIG. 7 is that messages are not routed to the same node they came from, even if multiple parallel links exists between two nodes. In the practice of the present invention, each node recognizes that the same NNI address prefix is repeated on more than one link when parallel links are constructed and considers them as one link.

Another overriding rule is that there exists a predefined significant length that is not considered a match. In a typical private network installation, e.g., a private company network, the address prefixes of each node in the company will likely all start in the same fashion. For example, each node might begin with B13. Thus, nodes may be addressed as B131, B132, B1311, etc. In this case the beginning portion of the network address 'B13' should not be considered a valid significant length for matching purposes. However, for a port address to be considered a match, it nevertheless must match from the very first nibble regardless of the number of nibbles common to all the addresses. Thus, for example, port addresses B or B1 would not be considered matches because their lengths are less then three nibbles.

To prevent endless loops in the network, the present invention comprises means for preventing loops located within each node and within the signaling itself. Within the signaling protocol a hop count is maintained. Each node along the path that receives the SETUP message from a NNI port extracts the hop count and checks to see that it does not exceed the previously configured maximum hop parameter, discussed previously. Steps 106 and 108 also comprises incrementing the hop count within the message before placing the message onto an output port.

In addition, on each node, before step 102 is performed, the 13 byte network prefix 74 (FIG. 3) of the destination address is checked against the local node's 13 byte network prefix. If they match, a RELEASE message is sent back to the node that sent the SETUP message because this means that the destination node was found but the user does not exist.

Load Balancing

The routing method of the present invention also comprises the capability to perform load balancing or load sharing among nodes. On a particular node, in performing the method of FIG. 7, at each step there may be more than one suitable match found (e.g., multiple links that are equally 'best'). Within each step of FIG. 7, the addresses for the equally 'best' links are placed in an array according to match length. Thus a two dimensional array is used to hold the network addresses grouped by match length that meet the criteria of that particular step. Also stored according to match length is the last link that was used for that decision block. For a particular decision block, the next time a match is found with that particular length, the registered link next in line in the array is used and stored as the last used link, thus balancing the load across 'equally' matching links.

Crankback

As described above, the present invention incorporates the ability to balance the load across equally matching nodes. When a node receives a SETUP message it ultimately determines all the qualifying links. It saves these links in an array or database within the node itself. The SETUP message is then forwarded to links in the array in a round robin fashion. However, a RELEASE message may arrive back to the node that sent the SETUP message. The RELEASE message may have been sent because no route exists to the destination along that particular path. In this case, the node tries the next link in the array without performing a recalculation to determine an appropriate link to forward the SETUP message. Thus, processing resources are conserved on the node because the route calculation is done only once and the results stored in the array.

Explanatory Example

As an illustration of the routing method of the present invention, the network shown in FIG. 4 will be used as an example in describing how a connection between two nodes is actually routed. Shown in FIG. 4 are two users, USER1 85 and USER2 83. Assume that USER1 desires to connect with USER2, thus USER2 is the destination address with a network prefix of A211. The following is the routing scenario using the method of the invention.

First, node B21 determines that it is connected to nodes B2 and B11 because their network addresses were previously registered. Using the method of FIG. 7, node B21 finds neither a full nor a partial match because B2 and B11 do not match at all with A211. Thus, node B21 routes the SETUP message to the address with the shortest prefix it finds: B2. Node B2 it connected to nodes A 11 and B. In trying to route the call, node B2 does not find a full match but finds a partial match with A11 because the 'A' matches the first nibble of the destination address. Thus, node B2 routes to node A11. Node A11 is connected to A21 and A111. Node A21, however, is a full match because the address, for its entire significant length of 3, matches the first 3 nibbles of the destination address, A21. Thus, node A11 routes to node A21. Node A21 is connected to node A11 and node A211. Node A211 is a full match to the destination address A211 and the call is routed there. At node A211 an exact match to the user is found and the call finally reaches its destination, USER2.

While the invention has been described with respect to a limited number of embodiments, it will be appreciated that many variations, modifications and other applications of the invention may be made.

What is claimed is:

1. A method of routing in an Asynchronous Transfer Mode (ATM) network, said network including a plurality of nodes, each said node having one or more ports and possibly connected to one or more users through a first type link, said nodes connected to each other through a second type link, said network including a source node connected to a source user and a destination node connected to a destination user having a destination address, said source user generating a SETUP message containing said destination address, each node having a network address comprising a network prefix and a significant length, said method comprising the steps of:

constructing said network in hierarchical fashion out of one or more trees, each said tree having a root such that said trees are connected in a mesh at their roots;

exchanging identification messages between said nodes across each of said links on each node (termed the current node) in the routing path;

making a first determination of whether said destination address matches the network address of a user connected to said current node through said first type link;

outputting said SETUP message to a port in accordance with said first determination if said first determination is true;

making a second determination of whether said destination address fully matches the network address of a node connected to said current node through said second type link;

outputting said SETUP message to a port in accordance with said second determination if said second determination is true;

making a third determination of whether said destination address partially matches the network address of a node connected to said current node through said second type link;

outputting said SETUP message to a port in accordance with said third determination if said third determination is true; and outputting said SETUP message onto a default port.

2. The method according to claim 1, wherein said step of constructing comprises the steps of:

arranging said plurality of nodes so as to form one or more trees, each said tree having a root and one or more nodes coupled to said root;

connecting said trees together at their roots such that said roots form at least a partial mesh; and assigning each said node a network address, assigning said network addresses in hierarchical fashion such that nodes further away from said root are assigned longer network prefixes and network nodes within the same hierarchical level have equal significant lengths.

3. The method according to claim 1, wherein said step of exchanging comprises the steps of:

each said node sending an identification message out on ports that are connected to other nodes, said identification message comprising a network prefix and a significant length; and each node receiving said identification message, registering said network prefix for the port it was received on.

4. The method according to claim 1, wherein said step of making a first determination comprises comparing the full network address against the network addresses of each user connected to said current node.

5. The method according to claim 1, wherein said step of making a second determination comprises choosing a node coupled to said current node whose network address prefix, up to its significant length, is the longest address prefix that completely matches said destination address prefix.

6. The method according to claim 1, wherein said step of making a third determination comprises choosing a node coupled to said current node whose network address prefix, up to its significant length, partially matches said destination address prefix, the match chosen from several partial matches is the match with the shortest significant length.

7. The method according to claim 1, wherein said step of outputting said SETUP message onto a default port comprises choosing a node coupled to said current node having a network address prefix with the shortest significant length.

8. The method according to claim 7, wherein the significant length of the network address prefix of said chosen node must be smaller than or equal to the significant length of the network address prefix of said current node.

9. The method according to claim 1, further comprising:
    making a forth determination of whether said destination address prefix matches the address prefix of said current node; and
    outputting a RELEASE message to the port said SETUP message was received on.

10. The method according to claim 1, further comprising the steps of:
    maintaining a hop count in said SETUP message;
    verifying, at each node in said routing path, that said hop count has not exceeded a predetermined maximum;
    incrementing a hop count field within said SETUP message before forwarding said message to the next node on said routing path.

11. The method according to claim 1, further comprising the step of balancing the load across a plurality of equally matching nodes.

12. The method according to claim 1, further comprising the step of balancing the load across a plurality of equally matching nodes using a round robin technique.

13. The method according to claim 1, further comprising the step of performing crankback operation in response to finding that a route to the destination does not exist on the routing path.

14. A method of routing in an Asynchronous Transfer Mode (,ATM) network, said network including a plurality of nodes, said nodes connected to each other by one more links, said network including a source node connected to a source user and a destination node connected to a destination user, said source and said destination user connected to said source node and said destination node, respectively, each node having a network address comprising a network prefix and a significant length, said method comprising the steps of:
    on each node, termed the current node, in the routing path;
        making a first determination of whether said destination address matches the network address of a user connected to said current node through said first type link;
        outputting said SETUP message to a port in accordance with said first determination if said first determination is true;
        making a second determination of whether said destination address fully matches the network address of a node connected to said current node through said second type link;
        outputting said SETUP message to a port in accordance with said second determination if said second determination is true;
        making a third determination of whether said destination address partially matches the network address of a node connected to said current node through said second type link;
        outputting said SETUP message to a port in accordance with said third determination if said third determination is true; and
        outputting said SETUP message onto a default port.

15. The method according to claim 14, further comprising the steps of:
    maintaining a hop count in said SETUP message;
    verifying, at each node in said routing path, that said hop count has not exceeded a predetermined maximum; and
    incrementing a hop count field within said SETUP message before forwarding said message to the next node on said routing path.

16. The method according to claim 14, further comprising the step of balancing the load across a plurality of equally matching nodes.

17. The method according to claim 14, further comprising the step of balancing the load across a plurality of equally matching nodes using a round robin technique.

18. The method according to claim 14, further comprising the step of performing a crankback operation in response to finding that a route to the destination does not exist on the routing path.

* * * * *